(12) United States Patent
Oxaal

(10) Patent No.: US 7,542,035 B2
(45) Date of Patent: Jun. 2, 2009

(54) METHOD FOR INTERACTIVELY VIEWING FULL-SURROUND IMAGE DATA AND APPARATUS THEREFOR

(76) Inventor: Ford Oxaal, 42 Western Ave., Cohoes, NY (US) 12047

( * ) Notice: Subject to any disclaimer, the term of this patent is extended or adjusted under 35 U.S.C. 154(b) by 656 days.

(21) Appl. No.: 10/602,666

(22) Filed: Jun. 25, 2003

(65) Prior Publication Data

US 2004/0004621 A1    Jan. 8, 2004

Related U.S. Application Data

(63) Continuation of application No. 09/871,903, filed on Jun. 4, 2001, now abandoned, which is a continuation of application No. 09/228,760, filed on Jan. 12, 1999, now Pat. No. 6,243,099, and a continuation-in-part of application No. 08/749,166, filed on Nov. 14, 1996, now Pat. No. 5,903,782.

(60) Provisional application No. 60/006,800, filed on Nov. 15, 1995, provisional application No. 60/071,148, filed on Jan. 12, 1998.

(51) Int. Cl.
*G06T 17/00* (2006.01)
*G09G 5/00* (2006.01)

(52) U.S. Cl. ..................... 345/420; 345/582

(58) Field of Classification Search ................. 345/419, 345/420, 427, 582, 583, 585; 703/1, 2, 6; 463/32, 34

See application file for complete search history.

(56) References Cited

U.S. PATENT DOCUMENTS

| 3,725,563 | A | | 4/1973 | Woycechowsky |
| 4,667,236 | A | | 5/1987 | Dresdner |
| 4,728,839 | A | | 3/1988 | Coughlan et al. |
| 4,763,280 | A | | 8/1988 | Robinson et al. |
| 4,821,209 | A | | 4/1989 | Hempel et al. |
| 4,899,293 | A | * | 2/1990 | Dawson et al. .............. 345/423 |
| 5,027,287 | A | | 6/1991 | Artigalas et al. |
| 5,185,667 | A | | 2/1993 | Zimmermann |

(Continued)

FOREIGN PATENT DOCUMENTS

EP    1 341 383 A2    9/2003

(Continued)

OTHER PUBLICATIONS

Comaniciu, D., Ramesh, V., and Meer, P., "Real-Time Tracking of Non-Rigid Objects Using Mean-shift," IEEE Computer Vision and Pattern Recognition, vol. 1 II, 2000, pp. 142-149.

(Continued)

*Primary Examiner*—Ryan R Yang
(74) *Attorney, Agent, or Firm*—Groover & Associates

(57) ABSTRACT

A method of modeling of the visible world using full-surround image data includes steps for selecting a view point within a p-surface, selecting a direction of view within the p-surface, texture mapping full-surround image data onto the p-surface such that the resultant texture map is substantially equivalent to projecting full-surround image data onto the p-surface from the view point to thereby generate a texture mapped p-surface, and displaying a predetermined portion of the texture mapped p-surface. An apparatus for implementing the method is also described.

123 Claims, 4 Drawing Sheets

U.S. PATENT DOCUMENTS

| | | | |
|---|---|---|---|
| 5,321,776 A | 6/1994 | Shapiro | |
| 5,359,363 A | 10/1994 | Kuban et al. | |
| 5,396,284 A | 3/1995 | Freeman | |
| 5,434,617 A | 7/1995 | Bianchi | |
| 5,495,292 A | 2/1996 | Zhang et al. | |
| 5,666,157 A | 9/1997 | Aviv | |
| 5,684,937 A | 11/1997 | Oxaal | |
| 5,694,533 A * | 12/1997 | Richards et al. | 345/420 |
| 5,923,334 A * | 7/1999 | Luken | 345/423 |
| 6,028,584 A * | 2/2000 | Chiang et al. | 345/628 |
| 6,049,281 A | 4/2000 | Osterweil | |
| 6,147,709 A | 11/2000 | Martin et al. | |
| 6,215,519 B1 | 4/2001 | Nayar et al. | |
| 6,243,099 B1 | 6/2001 | Oxaal | |
| 6,344,852 B1 | 2/2002 | Zhu | |
| 6,509,926 B1 | 1/2003 | Mills et al. | |
| 6,724,421 B1 | 4/2004 | Glatt | |
| 6,757,434 B2 | 6/2004 | Miled et al. | |
| 6,763,068 B2 | 7/2004 | Oktem | |
| 2003/0128756 A1 | 7/2003 | Oktem | |

FOREIGN PATENT DOCUMENTS

| | | | |
|---|---|---|---|
| WO | WO 02/062056 A1 | 8/2002 | |

OTHER PUBLICATIONS

Y. Yardimci, I. Yilmaz, A. E. Cetin, "Correlation Tracking Based on Wavelet Comain Information," Proceedings of SPIE vol. #5204, San Diego, Aug. 5-7, 2003.

A M. Bagci, Y. Yardimci, A. E. Cetin, "Moving Object Detection Using Adaptive Subband Decomposition and Franctional Lower-Order Statistics in Video Sequences," Signal Processing, 82 (12): 1941-1947, Dec. 2002.

C. Stauffer, W. Grimson, "Adaptive Background Mixture Models for Real-Time Tracking." Proc. IEEE CS Conf. on Computer Vision and Pattern Recognition, vol. 2, 1999, pp. 246-252.

"A System for Video Surveillance and Monitoring," in Proc. American Nuclear Society (ANS) Eighth International Topical Meeting on Robotics and Remote Systems, Pittsburgh, PA, Apr. 25-29, 1999 by Collins, Lipton and Kanade.

Aube, 12th International Conference on Automatic Fire Detection, 2001.

X. Zhou, R. Collins, T. Kanade, and P. Metes, "A Master-Slave System to Acquire Biometric Imagery of Humans at Distance", ACM International Workshop on Video Surveillance, Nov. 2003.

* cited by examiner

METHOD FOR INTERACTIVELY VIEWING FULL-SURROUND IMAGE DATA AND APPARATUS THEREFOR

CROSS-REFERENCE TO RELATED APPLICATIONS

This is a Continuation of Ser. No. 09/871,903 (filed Jun. 4, 2001 and now abandoned), which is a Continuation of U.S. Pat. No. 6,243,099 (filed Jan. 12, 1999 as Ser. No, 09/228, 760), the '099 patent being a Continuation-in-Part of U.S. Pat. No. 5,903,782 (filed Nov. 14, 1996 as Ser. No. 08/749,166), which application claims priority from Provisional Patent Application Ser. No. 60/006,800 (filed Nov. 15, 1995), the '099 patent also claiming priority from Provisional Patent Application Ser. No. 60/071,148 (filed Jan. 12, 1998).

REFERENCE TO COMPUTER PROGRAM LISTING SUBMITTED ON CD

This application incorporates by reference the computer program listing appendix submitted on (1) CD-ROM entitled "Viewer Computer Program Listing" in accordance with 37 C.F.R. §1.52(e). Pursuant to 37 C.F.R. §1.77(b)(4), all of the material on the CD-ROM is incorporated by reference herein, the material being identified as follows:

| File Name | Size in Kilobytes | File Type | Date Created |
|---|---|---|---|
| FIGS. 9AG.txt | 11 KB | text | Oct. 30, 2000 |
| FIGS.-10AB.txt | 2 KB | text | Oct. 30, 2000 |
| ggConstants.h | 2 KB | text | Oct. 30, 2000 |
| glmain.c | 11 KB | text | Oct. 30, 2000 |
| sidebyside.c | 15 KB | text | Oct. 30, 2000 |
| sphere_map.c | 2 KB | text | Oct. 30, 2000 |
| warp.c | 5 KB | text | Oct. 30, 2000 |
| warp.h | 1 KB | text | Oct. 30, 2000 |

A portion of the disclosure of this patent document including said computer code contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to a method and corresponding apparatus for viewing images. More specifically, the present invention relates to a method and corresponding apparatus for viewing full-surround, e.g., spherical, image data.

Systems and techniques for changing the perspective of a visible image in producing a resultant image, or systems and methods of transforming an image from one perspective form to another have been the subject of scientific thought and research for many years. Systems and techniques for transforming visible images can generally be divided into three separate categories:

(1) perspective generation systems and methods suitable for applications such as flight simulators;
(2) three-dimensional (3D) to two-dimensional (2D) conversion systems and methods; and
(3) miscellaneous systems and methods.

The first category includes U.S. Pat. No. 3,725,563, which discloses a method of and apparatus for raster scan transformations using rectangular coordinates which are suitable for electronically generating images for flight simulators and the like. More specifically, the patent discloses a technique for raster shaping, whereby an image containing information from one viewpoint is transformed to a simulated image from another viewpoint. On the other hand, U.S. Pat. No. 4,763, 280 discloses a curvilinear dynamic image generation system for projecting rectangular coordinate images onto a spherical display surface. In the disclosed system, rectangular coordinates are converted to spherical coordinates and then the spherical coordinates are distorted for accomplishing the desired simulation of curvature.

The second category of systems and techniques perform 3D-to-2D conversion, or vice versa. For example, U.S. Pat. No. 4,821,209 discloses a method of and apparatus for data transformation and clipping in a graphic display system, wherein data transformation is accomplished by matrix multiplication. On the other hand, U.S. Pat. No. 4,667,236 discloses a television perspective effects system for providing perspective projection whereby each point of a three-dimensional object is projected onto a two-dimensional plane. New coordinates X' and Y' are prepared from the original coordinates X, Y and Z, and the viewing distance D, using the general formulas $X'=XD/Z$ and $Y'=YD/Z$. As the object to be displayed is rotated around the X or Y axis, the viewing distance D is changed for each point.

In the third category, miscellaneous systems and methods are disclosed by, for example, U.S. Pat. No. 5,027,287, which describes a device for the digital processing of images to obtain special geometrical effects wherein digital image data corresponding to intersection points on a rectangular X,Y grid are transposed by interpolation with respect to intersection points of a curved surface. U.S. Pat. No. 4,882,679, on the other hand, discloses a system and associated method of reformatting images for three-dimensional display. The disclosed system is particularly useful for generating three-dimensional images from data generated by diagnostic equipment, such as magnetic resonance imaging.

However, none of the above described methods or systems permit viewing in circular perspective, which is the best way to view spherical data. Circular perspective does all that linear perspective does when zoomed in, but it allows the view to zoom out to the point where the viewer can see almost everything in the spherical data simultaneously in a visually palatable and coherent way.

What is needed is a method for viewing full-surround, e.g., spherical, image data employing circular perspective. Moreover, what is needed is an apparatus for viewing full-surround, e.g., spherical, image data employing circular perspective. What is also needed is a method for viewing full-surround, e.g., spherical, image data employing circular perspective which is computationally simple. Preferably, the method for viewing full-surround, e.g., spherical, image data employing circular perspective can be employed on any personal computer (PC) system possessing a three dimensional (3-D) graphics capability.

SUMMARY OF THE INVENTION

Based on the above and foregoing, it can be appreciated that there presently exists a need in the art for viewing methods and corresponding apparatuses which overcome the above-described deficiencies. The present invention was motivated by a desire to overcome the drawbacks and shortcomings of the presently available technology, and thereby fulfill this need in the art.

The present invention implements a novel and practical circular perspective viewer for spherical data. Moreover, it implements the circular perspective viewer within the context of existing 3D graphics utilities native to personal computers (PCs). Thus, the method and corresponding apparatus for circular perspective viewing is practical for a broad market.

One object according to the present invention is to provide a method and corresponding apparatus for modeling the visible world by texture mapping full-surround image data.

Another object according to the present invention is to provide a method and corresponding apparatus for modeling the visible world by texture mapping full-surround image data onto a p-surface whereby the resultant texture map is substantially equivalent to projecting full-surround image data onto the p-surface from a point Q inside the region X of the p-surface.

Still another object according to the present invention is to provide a method and corresponding apparatus for modeling the visible world by texture mapping full-surround image data wherein the viewer is allowed to interactively rotate the model.

Yet another object according to the present invention is to provide a method and corresponding apparatus for modeling the visible world by texture mapping full-surround image data wherein the viewer is allowed to interactively change the direction of vision.

A still further object according to the present invention is to provide a method and corresponding apparatus for modeling the visible world by texture mapping full-surround image data, wherein the viewer is allowed to interactively alter the focal length or view angle.

Another object according to the present invention is to provide a method and corresponding apparatus for modeling the visible world by texture mapping full-surround image data, wherein the viewer is allowed to interactively change the direction of view.

Still another object according to the present invention is to provide a method and corresponding apparatus for modeling the visible world by texture mapping full-surround image data, wherein the viewpoint is close to the surface of the p-sphere.

Another object according to the present invention is to provide a method and corresponding apparatus for modeling the visible world by texture mapping full-surround image data, wherein the viewer is allowed to interactively change the direction of view.

A further object according to the present invention is to provide a method and corresponding apparatus for modeling the visible world by texture mapping full-surround image data, wherein the viewer is allowed to select an area of the image and cause another model of the visible world to be loaded into said viewing system.

Another object according to the present invention is to provide a method and corresponding apparatus for modeling the visible world by texture mapping full-surround image data, wherein the viewer is allowed to perform any combination of actions specified immediately above.

It will be appreciated that none of the above-identified objects need actually be present in invention defined by the appended claims. In other words, only certain, and not all, objects of the invention have been specifically described above. Numerous other objects advantageously may be provided by the invention, as defined in the appended claims, without departing from the spirit and scope of the invention.

These and other objects, features and advantages according to the present invention are provided by a method of modeling the visible world using full-surround image data. Preferably, the method includes steps for selecting a view point within a p-surface, and texture mapping full-surround image data onto the p-surface such that the resultant texture map is substantially equivalent to projecting full-surround image data onto the p-surface from the view point to thereby generate a texture mapped p-surface.

According to one aspect of the invention, the method also includes a step for either rotating the texture mapped p-surface or changing the direction of view to thereby expose a new portion of the texture mapped p-surface. According to another aspect of the invention, a first texture mapped p-sphere is replaced by a second texture mapped p-sphere by interactively selecting the new viewpoint from viewpoints within the second texture mapped p-sphere.

These and other objects, features and advantages according to the present invention are provided by a method of modeling of the visible world using full-surround image data, the method comprising steps for providing the full surround image data, selecting a view point within a p-surface, texture mapping full-surround image data onto the p-surface such that the resultant texture map is substantially equivalent to projecting full-surround image data onto the p-surface from the view point to thereby generate a texture mapped p-surface, and displaying a predetermined portion of the texture mapped p-sphere.

These and other objects, features and advantages according to the present invention are provided by an apparatus for modeling the visible world using full-surround image data, comprising first circuitry for selecting a view point within a p-surface, second circuitry for texture mapping full-surround image data onto the p-surface such that the resultant texture map is substantially equivalent to projecting full-surround image data onto the p-surface from the view point to thereby generate a texture mapped p-surface, and third circuitry for displaying a predetermined portion of the texture mapped p-sphere.

According to one aspect, the present invention provides a method of modeling of the visible world using full-surround image data, the method including steps for selecting a view point within a p-surface, selecting a direction of view within the p-surface, texture mapping full-surround image data onto the p-surface such that the resultant texture map is substantially equivalent to projecting full-surround image data onto the p-surface from the view point to thereby generate a texture mapped p-surface, and displaying a predetermined portion of the texture mapped p-surface. If desired, texture mapped p-surface can be rotated so as to simulate rotating the direction of view in the opposite direction. Preferably, the method further includes a step for interactively changing the direction of view to thereby expose a corresponding portion of the texture mapped p-surface. In addition, the method permits a viewer to interactively alter at least one of focal length or an angle of view relative to the textured mapped p-surface to thereby vary the displayed portion of the texture mapped p-surface. Advantageously, the method can include steps for selecting a new viewpoint, repeating the texture mapping step using the new viewpoint, and redisplaying the predetermined portion of the p-surface, whereby a first image portion occupying the predetermined portion displayed during the displaying step is different than a second image portion occupying the predetermined portion during the redisplaying step. In that instance, the selecting step can include interactively selecting the new viewpoint. Moreover, the first texture mapped p-surface is replaced by a second texture mapped p-surface by interactively selecting the new viewpoint from viewpoints within the second texture mapped p-surface. Beneficially, the new viewpoint can be close to the surface of the p-surface.

According to another aspect, the present invention provides a method for interactively viewing a model of the visible world formed from full-surround image data, including steps for providing the full surround image data, selecting a view point within a p-surface, establishing a first direction of view within the p-surface, texture mapping full-surround image data onto the p-surface such that the resultant texture map is substantially equivalent to projecting full-surround image data onto the p-surface from the view point to thereby generate a texture mapped p-sphere, interactively changing the direction of view to thereby select a second direction of view, and displaying a predetermined portion of the texture mapped p-sphere as the texture mapped p-sphere moves between the first and second directions of view. Advantageously, the interactively changing step results in rotating the texture mapped p-sphere so as to simulate rotating the direction of view in the opposite direction.

According to a further aspect, the present invention provides an apparatus for interactively viewing a model of the visible world formed from full-surround image data stored in memory, including a first device for selecting a view point within a p-surface, a second device for establishing a first direction of view within the p-surface, a third device for texture mapping full-surround image data onto the p-surface such that the resultant texture map is substantially equivalent to projecting full-surround image data onto the p-surface from the view point to thereby generate a texture mapped p-sphere, a fourth device for interactively changing the direction of view to thereby select a second direction of view, and a display device for displaying a predetermined portion of the texture mapped p-sphere as the texture mapped p-sphere moves between the first and second directions of view. Advantageously, the fourth device effectively rotates the texture mapped p-sphere so as to simulate rotating the direction of view in the opposite direction. Preferably, the first through fourth devices are software devices.

These and other objects, features and advantages of the invention are disclosed in or will be apparent from the following description of preferred embodiments.

BRIEF DESCRIPTION OF THE DRAWINGS

These and various other features and aspects of the present invention will be readily understood with reference to the following detailed description taken in conjunction with the accompanying drawings, in which like or similar numbers are employed throughout, and in which.

DETAILED DESCRIPTION OF THE PREFERRED EMBODIMENTS

The method and corresponding apparatus according to the present invention are similar to that disclosed in U.S. Pat. No. 5,684,937, which patent is incorporated herein by reference for all purposes, in that it generates perspective views derived for constants less than or equal to two, and greater than or equal to one, i.e., $1.0 \leq X \leq 2.0$. However, it will be appreciated that the inventive method and apparatus are different from U.S. Pat. No. 5,684,937 in that the method for deriving perspective is different than 'explicitly' dividing all angles by a selected constant, as disclosed in that patent. Instead, the angles are 'implicitly' divided by a constant by moving the viewpoint around inside a "p-sphere". Additional details will be provided below.

By employing the method and corresponding apparatus according to the present invention, it is possible to create a virtual pictosphere using a conventional 3-D graphics system. Preferably, the inventive method and apparatus texture map the visible world onto a sphere. It should be mentioned that when the user selects a viewpoint at the center of this sphere and renders the view using the primitives of a conventional 3D graphics system, the user implicitly divides all angles by one, and results in a linear perspective view. However, when the user selects a viewpoint on the surface of this sphere, selects a direction of view towards the center, and renders the view using the primitives of a conventional 3D graphics system, the user implicitly divides all angles by two, thus creating a circular perspective view. Moreover, by allowing the viewpoint to move around within or on the sphere, the user achieves results virtually identical to those achieved by U.S. Pat. No. 5,684,937 for constants ranging from 1.0 to 2.0.

It will be appreciated that the method and corresponding apparatus according to the present invention implement a novel and practical circular perspective viewer of spherical data. The inventive method and apparatus advantageously can be achieved within the context of existing 3-D graphics utilities and hardware native to PCs. It will be noted from the statement immediately above that the inventive method and apparatus advantageously can be implemented in a broad range of existing systems.

Figure 1:
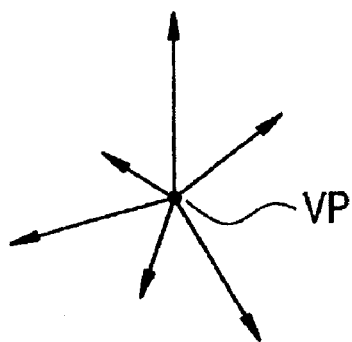
FIG. 1 illustrates a set of all rays from a predetermined viewpoint, which illustration facilitates an understanding of the present invention.
Figure 2:
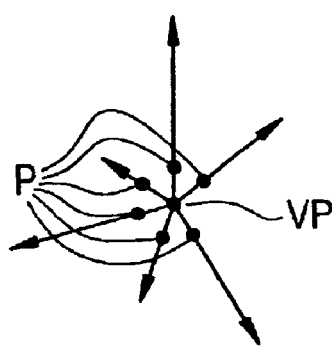
FIG. 2 illustrates a set of points, excluding the viewpoint, located on a corresponding one of the rays, which illustration facilitates an understanding of the present invention.

The method and corresponding apparatus according to the present invention are predicated on the following starting, i.e., given, conditions:

(1) the set of all rays V from a given point VP, as illustrated in FIG. 1;

(2) a set of points P not including VP, each point in P being contained by one and only one ray in V, as illustrated in FIG. 2; and (3) the set of color values C, each color in C being associated with one and only one ray in V, and also thereby associated with the point in P contained by said ray.

Moreover, the following definitions apply:

(1) POINTS P: The visible world.

Figure 3:
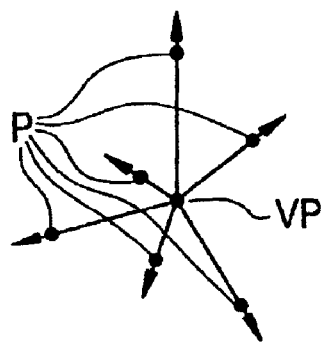
FIG. 3 illustrates the formation of a projection of the set of points, or a subset thereof, illustrated in FIG. 2.
Figure 4A:
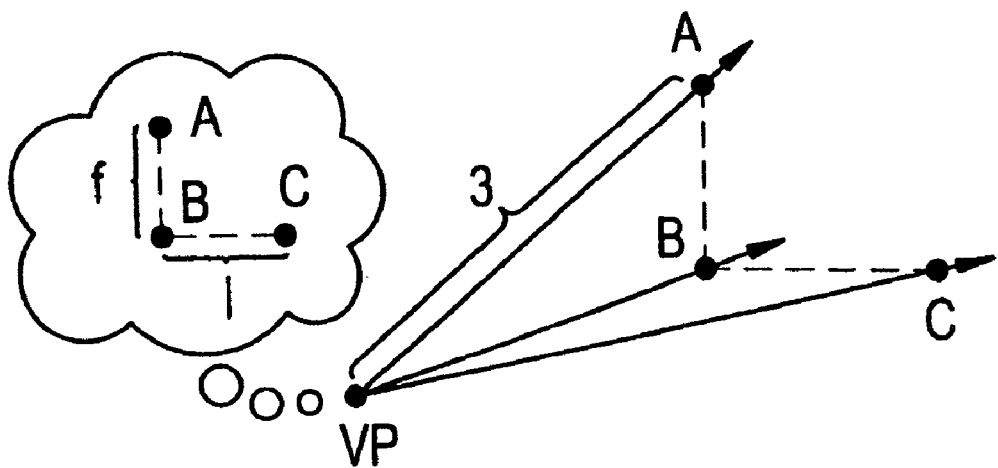
FIGS. 4A and 4B illustrate the resultant images generated by two different projections, respectively, given a constant viewpoint.
Figure 4B:
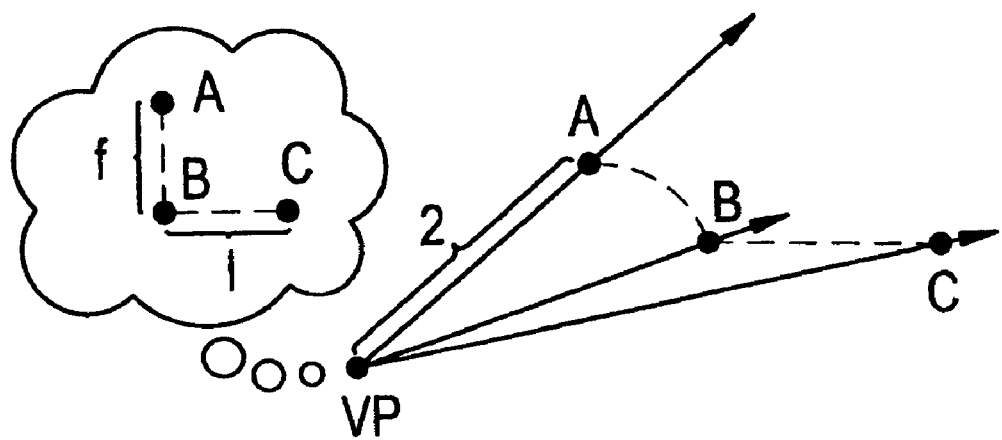

(2) A PROJECTION OF P: A subset of points P. Any number of points Pn contained in P may be slid closer to or further from point VP along their corresponding rays. The resultant new configuration of points P is called a projection of P. The concept can best be understood by referring to FIG. 3;

(3) MAGIC POINT, VIEWPOINT, OR POINT OF PROJECTION: Point VP. Please note, no matter how points P are projected, their appearance will remain the same when viewed from point VP. This latter concept may best be understood by referring to FIGS. 4A and 4B.

(4) FULL-SURROUND IMAGE DATA: data which samples the points P. This data encodes, explicitly or implicitly, the association of a color value with a given direction from a given point of projection. It should be mentioned at this point that full-surround image data is useful in many fields of entertainment because, when delivered to many viewers, it enables the construction of an independent viewing system defined below.

(5) P-SPHERE: a computer graphics representation of any polyhedron where there exists at least one point x inside (neither intersecting, nor lying outside) the polyhedron which may be connected to every point of the polyhedron with a distinct line segment, no portion of which said line segment lies outside the polyhedron or intersects the polyhedron at a point not an endpoint. The union of all such points x form the region X of the p-sphere. For a convex p-sphere, the region X is all points of the interior of the p-sphere. Examples of computer graphics objects which may be modeled as p-spheres include a tetrahedron, a cube, a dodecahedron, and a faceted sphere.

(6) P-SURFACE: a computer graphics representation of any surface with a well-defined inside and outside, where there exists at least one point x inside (neither intersecting, nor lying outside) the surface which may be connected to every point of the surface with a distinct line segment, no portion of which said line segment lies outside the surface or intersects the surface at a point not an endpoint. The union of all such points x form the region X of the p-surface. For a convex p-surface, the region X is all points of the interior of the p-surface. Examples of computer graphics objects which may be modeled as p-surfaces: tetrahedron, cube, sphere, ellipsoid, cylinder, apple torus, lemon torus, b-spline surfaces closed or periodic in u and v. A p-sphere is a p-surface.

Figure 5:
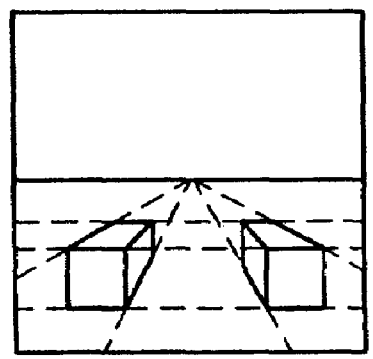
FIG. 5 illustrates the concept of linear perspective.

(7) LINEAR PERSPECTIVE: the projection of a portion of the visible world onto a plane or portion of a plane, as illustrated in FIG. 5.

Figure 6:
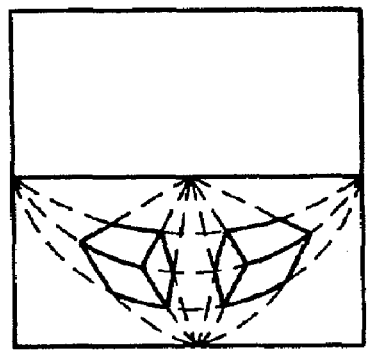
FIG. 6 illustrates the concept of circular perspective.
Figure 7:
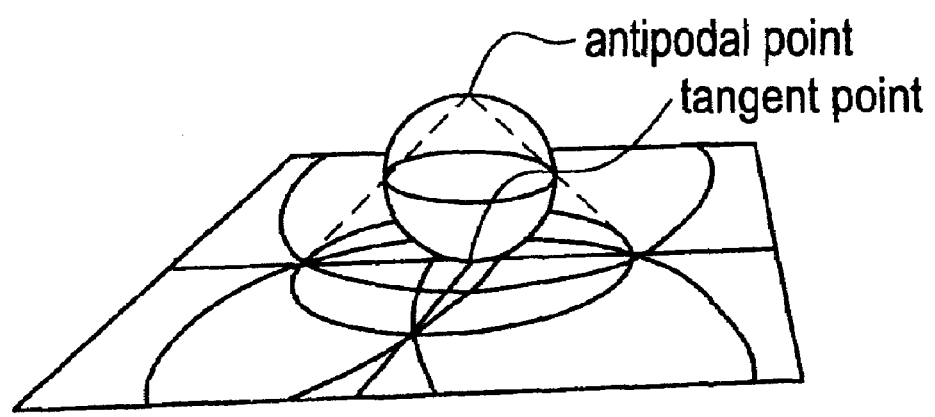
FIG. 7 illustrates the concept of stereographic projection.

(8) CIRCULAR PERSPECTIVE: the projection of the visible world, or portion thereof onto a plane, or a portion of a plane, after performing the perspective transformation of the visible world according to U.S Pat. No. 5,684,937, where the constant employed is 2. After such a transformation, when the direction of vision specified in said transformation is perpendicular to the projection plane, there is a one-to-one mapping of all the points P defining the visible world and all the points of an infinite plane. This definition is illustrated in FIG. 6;

(9) STEREOGRAPHIC PROJECTION: the one-to-one mapping of each point on a sphere to each point of an infinite tangent plane, said mapping performed by constructing the set of all rays from the antipodal point of the tangent point, the intersection of said rays with the plane defining said mapping. The understanding of this definition will be facilitated by reference to FIG. 7. Please note that circular perspective and stereographic projection produce geometrically similar (identically proportioned) mappings when the direction of vision specified in the perspective transformation of circular perspective contains the tangent point specified in stereographic projection;

(10) INDEPENDENT VIEWING SYSTEM: an interactive viewing system in which multiple viewers can freely, independently of one another, and independently of the source of the image data, pan that image data in all directions with the effect that each viewer feels like they are "inside" of that imagery, or present at the location from which the imagery was produced, recorded, or transmitted; and

(11) STANDARD COMPUTER GRAPHICS SYSTEM: a computer graphics system which supports linear perspective viewing, including the changing of the focal length or the altering of the view angle, the apparent rotation of viewed objects, and/or the apparent changing of direction of vision, and the texture mapping of image data onto objects within the class of p-surface.

It will be appreciated that in a standard computer graphics system by texture mapping full-surround image data onto a p-surface such that the resultant texture map is effectively equivalent to projecting the full-surround imagery onto the p-surface from a some point Q contained in the region X of the p-surface, a representation of the visible world is achieved.

Referring to the file entitled FIGS. 9AG.txt, the method for viewing full-surround, e.g., spherical, image data will now be described. It should be mentioned that the corresponding code implementing the inventive method is written in the "C" language, although a plurality of programming languages are well known and readily adapted to this purpose. It will also be appreciated that code lines starting with "gl" or "glut" indicate calls to a conventional graphics library (GL) such as OpenGL™. One of ordinary skill in the art will readily appreciate that the last function in this listing is called main( ). This is where the program starts.

It will be appreciated from inspection of the file entitled FIGS. 9AG.txt that the routine main( ) calls various glut . . . functions to set up GL, the graphics library employed here. It will be noted that the glut . . . functions are part of GL. Furthermore, it will be appreciated that main( ) registers or maps certain keyboard events with GL with glutKeyboardFunc(Key). In other words, glutKeyboardFunc(Key) defines the response of the inventive method to operation of the corresponding "Key."

Moreover, Key( ) is a function describing the actions of GL to keyboard events. Of importance are keyboard events ('z' and 'Z') which move the viewpoint in and out along the Z axis relative to the "p-sphere", effectively altering the perspective of the view, and keyboard events (55, 57, 52, 54, 56 and 50) which control rotation of the "p-sphere", effectively allowing the viewer to "look around".

It will be noted that main( ) registers the function displays with GL, with the glutDisplayFunc(display) function. Moreover, display( ) uses the global variables controlled by Key( ) to move the viewpoint along the Z axis relative to the "p-sphere", and to rotate the "p-sphere" relative to a constant direction of view.

Preferably, display( ) builds the "p-sphere" with glCallList (current_texture->tex1) and glCallList(current_texture->tex2). In the first instance, tex1 is mapped to a triangulation approximating a hemisphere, and is added to the display list. In the second instance, tex2 is mapped to the same hemisphere—after rotating it 180 degrees to form a sphere—and is also added to the display list, in the function readTexture( ). Preferably, tex1 and tex2 are texture maps built from two pictures, respectively, taken with a fisheye lens. Advantageously, tex1 and tex2 collectively comprise a "pictosphere." It should be noted that the triangulation approximating the hemisphere was built in the function createhemisphere( ), the full listing of which is found in the file entitled FIGS. 10AB.txt and not the file entitled FIGS. 9AG.txt.

At this point, Key( ) and display( ) have been registered with GL. The code main( ) then calls initialize_objects( )

which actually calls the routines readTexture( ) and createHemisphere( ). All the other functions are support functions.

It will be appreciated that the user now has an instance of a p-sphere in GL made by mapping two fisheye images, e.g., photographs, to two adjoining hemispheres to thereby generate full-surround, e.g., spherical, image data. The user advantageously can interactively move the viewpoint away from the center of the p-sphere and, if so desired, very near the inside surface of the p-sphere. It should be mentioned at this point that the direction of view is still towards the center of the p-sphere. Moving the viewpoint from the center of the p-sphere automatically generates a circular perspective view, which advantageously can be displayed on display screen 20 of the PC illustrated in FIG. 8. Moving back to the center of the p-sphere, permits the user to generate a linear perspective view. It will also be appreciated from the discussion above that it is possible to rotate the surface of p-sphere, thus simulating looking around within the p-sphere.

It should be mentioned that by setting the viewpoint of the graphics system close to the center point of the p-sphere point and then enabling the viewer to rotate that p-sphere around a point close to the center point of the p-sphere, an independent viewing system providing linear perspective is achieved. Moreover, by adding the further capability of altering the focal length or angle of view, a zoom ability advantageously can be provided for the user.

It should also be mentioned that in the case where the p-surface employed to model the visible world is a good approximation of a sphere, that is, a substantially better model than a tetrahedron or a cube, and where the view point of that representation is close to the approximate center of that p-surface, then by allowing the viewer to move the viewpoint away from center point to a point close to the surface of the p-surface, an independent viewing system is achieved in circular perspective. This is astounding when one considers that the native graphics system of a conventional PC only supports viewing in linear perspective. The method and corresponding apparatus according to the present invention work because such an independent viewing system models stereographic projection, which is geometrically similar to circular perspective.

Furthermore, by letting the viewer move the viewpoint outside of the p-surface, the viewer can get a feeling for how the independent viewing works. This can be useful for designers of systems containing many hyper-linked full-surround surfaces. For example, many p-spheres picturing the penthouse terraces of New York advantageously can be linked together so that the viewer may hop from p-sphere to p-sphere, simulating a tour of the terraces.

Figure 8:
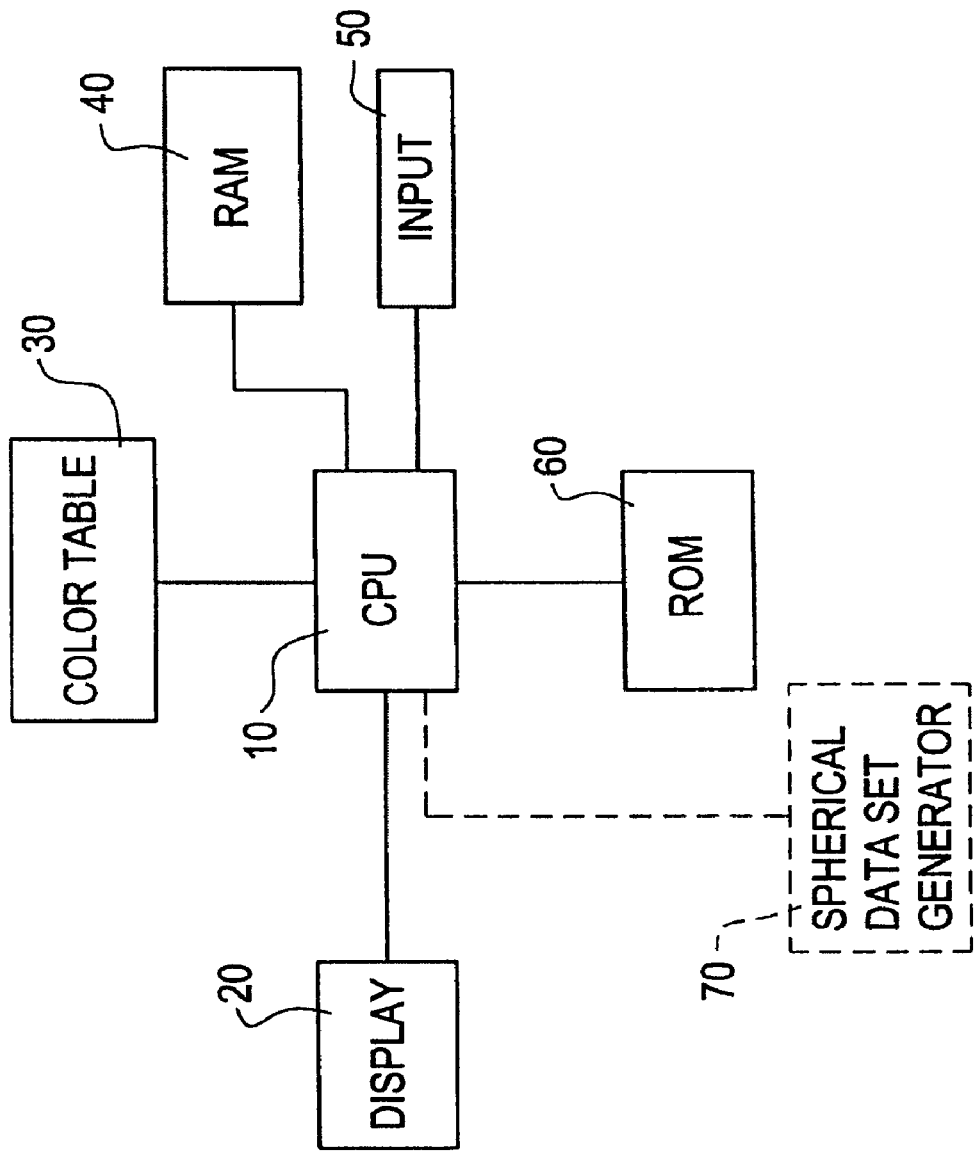
FIG. 8 is a high level block diagram of a circular perspective viewing system according to the present invention.

The above described method of the invention may be performed, for example, by the apparatus shown in FIG. 8. This viewing apparatus is composed of a central processing unit (CPU) 10 for controlling the components of the system in accordance with a control program stored in read-only memory (ROM) 60 or the like. The CPU 10 stores temporary data employed during execution of the inventive method, i.e., viewing method, in random-access memory (RAM) 40. After the majority of the method steps are performed, the generated visible points are displayed on display device 20 (e.g., cathode ray tube (CRT) or liquid crystal display (LCD)) as visible points in accordance with the appropriate color values stored in color table 30, e.g., a color lookup table (CLUT) found in the graphics controller in most PCs. Advantageously, a spherical data generator device 70, such as a camera or the like, and preferably the data generator system disclosed in U.S. Pat. No. 5,903,782, which patent is incorporated herein by reference in its entirety for all purposes, may be employed to generate different color values corresponding to the visible points of a viewed object, image or picture. An input device 50 is provided for entering data such as the viewer's viewing direction, reference plane, configuration (scaling) factor k, and other pertinent information employed in the inventive viewing method.

As mentioned above, it will be appreciated that the method and corresponding apparatus according to the present invention advantageously can be employed in an audiovisual or multimedia entertainment system. In particular, since each user advantageously can select his or her preferred view point and direction of view, multiple user can receive a single set of full-surround image data and generate corresponding multiple display images, in either linear or circular perspective.

Although presently preferred embodiments of the present invention have been described in detail herein, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method of modeling of the visible world using full-surround image data, said method comprising:
    selecting a view point within a p-surface, wherein the p-surface comprises polygons approximating a partial sphere;
    selecting a direction of view within the p-surface;
    texture mapping full-surround image data onto said p-surface such that the resultant texture map is substantially equivalent to projecting full-surround image data onto the p-surface from said view point to thereby generate a texture mapped p-surface; and
    displaying a predetermined portion of said texture mapped p-surface.

2. The method of claim 1, wherein the p-surface comprises one or more polygons such that there exists a half-space for each polygon, and wherein the intersection of all such half-spaces includes at least one point in common.

3. The method of claim 2, wherein a point is within the p-surface if it is included in the intersection.

4. The method of claim 1, wherein the p-surface comprises one or more polygons, and wherein a point is within the p-surface if it is included in the union of a given set of half-planes, wherein the set includes no more than one half-plane per polygon.

5. The method of claim 1, wherein the p-surface comprises one or more polygons, and wherein a point is within the p-surface if it is included in the intersection of a given set of half-planes, wherein the set includes no more than one half-plane per polygon.

6. The method of claim 1, wherein the full-surround image data is a sample of incoming image data.

7. A method of modeling a hemispheric view, said method comprising:
    capturing a first texture p-surface data set approximating a first hemisphere portion derived from a distorted view captured from a first wide-angle lens, said first texture p-surface data set comprising at least a portion of full-surround data, wherein the full-surround data includes a partial hemisphere;
    selecting a view point within the p-surface;
    selecting a direction of view within the p-surface;
    texture mapping the full-surround data to a triangulation approximating the first hemisphere onto the p-surface substantially equivalent to projecting the full-surround data onto the p-surface from said view point;

generating a texture mapped p-surface corresponding to the selected view; and displaying the selected view of the texture mapped p-surface.

8. The method of claim 7, wherein the full-surround data includes a full hemisphere.

9. The method of claim 7, further comprising steps of:

capturing a second texture p-surface data set approximating a second hemisphere portion derived from a second wide-angle lens, said second texture p-surface data set comprising a portion of full-surround data; and combining the first p-surface texture data set and the second p-surface texture data set to generate the full-surround data.

10. The method of claim 9, wherein the full-surround data includes a full sphere.

11. The method of claim 9, wherein the full-surround data includes a partial sphere.

12. The method of claim 7, further comprising steps of:

capturing a second texture p-surface data set approximating a second hemisphere portion derived from the first wide-angle lens after movement to a second view, said second p-surface texture data set comprising a portion of full-surround data; and combining the first texture p-surface data set and the second texture p-surface data set to generate the full-surround data.

13. A method of modeling an image from a wide-angle lens, said method comprising:

texture mapping image data from the wide-angle lens onto a triangulation of at least a portion of a first hemisphere of full-surround data onto a p-surface wherein the full-surround data includes a partial hemisphere;

selecting a viewpoint within the p-surface;

selecting a direction of view within the p-surface;

selecting a perspective of view;

generating a texture mapped p-surface corresponding to the selected view from the selected perspective using the full-surround data; and displaying the generated view of the texture mapped p-surface.

14. The method of claim 13, wherein the full-surround data includes a full hemisphere.

15. The method of claim 14, wherein the full-surround data includes a full sphere.

16. The method of claim 14, wherein the full-surround data includes a partial sphere.

17. The method of claim 14, wherein the full-surround data includes a full sphere.

18. The method of claim 14, wherein the full-surround data includes a partial sphere.

19. The method of claim 13, further comprising the steps of:

texture mapping image data from the wide-angle lens onto a triangulation approximating at least a portion of a second hemisphere of full-surround data onto a p-surface;

combining the full- surround data onto a combined p-surface of the portions of the first hemisphere and the second hemisphere to provide a full-surround data set of at least a portion of a sphere including more than a hemisphere.

20. The method of claim 13, further comprising the steps of:

texture mapping image data from a second wide-angle lens onto a triangulation approximating at least a portion of a second hemisphere of full-surround data onto a p-surface;

combining the full-surround data onto a combined p-surface of the first hemisphere and the second hemisphere to provide a full-surround data set of at least a portion of a sphere including more than a hemisphere.

21. The method of claim 13, further comprising the steps of:

texture mapping image data from a nth wide-angle lens onto a triangulation approximating at least portion of a nth hemisphere of full-surround data onto a p-surface, wherein n designates one of a y number of wide-angle lens which collectively capture overlapping parts of at least a portion of the y hemispheres of image data;

combining the full-surround data onto a combined p-surface of the first hemisphere and the nth hemisphere to provide a full-surround data set of at least a portion of a sphere including more than a hemisphere.

22. A method of modeling of the visible world using full-surround image data, said method comprising:

texture mapping full-surround image data onto a p-surface such that the resultant texture map is substantially equivalent to projecting the full-surround image data onto the p-surface from a point of projection to thereby generate a texture mapped p-surface;

selecting a direction of view from a view point; and displaying a portion of said texture mapped p-surface based on the selecting;

wherein the p-surface comprises polygons approximating a partial sphere.

23. The method of claim 22, wherein the p-surface comprises one or more polygons such that there exists a half-space for each polygon, and wherein the intersection of all such half-spaces includes at least one point in common.

24. The method of claim 23, wherein a point is within the p-surface if it is included in the intersection.

25. The method of claim 22, wherein the p-surface comprises one or more polygons, and wherein a point is within the p-surface if it is included in the union of a given set of half-planes, wherein the set includes no more than one half-plane per polygon.

26. The method of claim 22, wherein the p-surface comprises one or more polygons, and wherein a point is within the p-surface if it is included in the intersection of a given set of half-planes, wherein the set includes no more than one half-plane per polygon.

27. The method of claim 22, wherein the full-surround image data is a sample of incoming image data.

28. The method of claim 22, wherein the point of projection comprises the view point.

29. The method of claim 22, wherein the point of projection is different from the view point.

30. The method of claim 22, wherein the selecting a direction of view is performed by a user.

31. The method of claim 22, wherein the selecting a direction of view is performed by a user using an interactive user interface.

32. The method of claim 22, wherein the view point is within the p-surface.

33. A method of modeling a hemispheric view, said method comprising:

capturing a first texture p-surface data set approximating a first hemisphere portion derived from a distorted view captured from a first wide- angle lens, said first texture p-surface data set comprising at least a first portion of full-surround image data;

texture mapping the full-surround image data to a triangulation approximating the first hemisphere portion onto a p-surface in a manner substantially equivalent to projecting the full-surround image data onto the p-surface from a point of projection;

selecting a direction of view from a view point; and displaying a portion of the texture mapped p-surface based on the selecting wherein the full-surround image data includes at least a partial hemisphere.

34. The method of claim 33, wherein the full-surround image data includes a full hemisphere.

35. The method of claim 33, wherein the point of projection comprises the view point.

36. The method of claim 33, wherein the point of projection is different from the view point.

37. The method of claim 33, wherein the selecting a direction of view is performed by a user.

38. The method of claim 33, wherein the selecting a direction of view is performed by a user using an interactive user interface.

39. The method of claim 33, wherein the view point is within the p-surface.

40. The method of claim 33, further comprising steps of:

capturing a second texture p-surface data set approximating a second hemisphere portion derived from a second wide-angle lens, said second texture p-surface data set comprising at least a second portion of the full-surround image data; and combining the first p-surface texture data set and the second p-surface texture data sets to generate the full-surround image data.

41. The method of claim 40, wherein the full-surround image data includes a full sphere.

42. The method of claim 40, wherein the full-surround image data includes a partial sphere.

43. The method of claim 33, further comprising steps of:

capturing a second texture p-surface data set approximating a second hemisphere portion derived from the first wide-angle lens after movement from a first view to a second view, said second p-surface texture data set comprising at least a second portion of the full-surround image data; and combining the first texture p-surface data set and the second texture p-surface data set to generate the full-surround image data.

44. A method of modeling an image from a wide-angle lens, said method comprising:

texture mapping image data from the wide-angle lens onto a triangulation of at least a portion of a first hemisphere of full-surround image data onto a p-surface;

selecting a direction of view from a viewpoint within the p-surface; selecting a perspective of view;

generating a texture mapped p-surface corresponding to the selected direction of view from the selected perspective using the full-surround image data; and displaying a portion of the texture mapped p-surface based on the selecting a direction of view and the selecting a perspective of view;

wherein the full-surround image data includes at least a partial hemisphere.

45. The method of claim 44, wherein the full-surround image data includes a full hemisphere.

46. The method of claim 45, wherein the full-surround image data set includes a partial sphere.

47. The method of claim 45, wherein the full-surround image data includes a full sphere.

48. The method of claim 45, wherein the full-surround image data includes a partial sphere.

49. The method of claim 44, further comprising the steps of:

texture mapping image data from the wide-angle lens onto a triangulation approximating at least a portion of a second hemisphere of full-surround image data onto a p-surface to generate a combined p-surface comprised of the texture mapped image data approximating the at least portions of the first hemisphere and the second hemisphere, wherein the full-surround image data is comprised of at least a portion of a sphere including more than a hemisphere.

50. The method of claim 45, wherein the full-surround image data set includes a full sphere.

51. The method of claim 44, further comprising the steps of:

texture mapping image data from a second wide-angle lens onto a triangulation approximating at least a portion of a second hemisphere of full-surround image data onto a p-surface to generate a combined p-surface comprised of the texture mapped image data approximating the at least a portion of the first hemisphere and the second hemisphere, wherein the full-surround image data of at least a portion of a sphere including more than a hemisphere.

52. The method of claim 44, further comprising the steps of:

texture mapping image data from an nth wide-angle lens onto a triangulation approximating at least portion of an nth hemisphere of the full-surround image data onto a p-surface, wherein n designates one of a plurality y number of wide-angle lenses which collectively capture overlapping parts of at least a portion of the y hemispheres of the full-surround image data, wherein y>2;

combining the full-surround image data onto a combined p-surface of the first hemisphere and the nth hemisphere to provide a full-surround image data set is comprised of at least a portion of a sphere including more than a hemisphere.

53. A method, comprising:

texture mapping full-surround image data onto a p-surface to generate a texture map that is substantially equivalent to projecting the image data onto the p-surface from a point of projection to thereby generate a texture mapped p-surface;

selecting a direction of view from a view point; and displaying a portion of the texture mapped p-surface based on the selecting;

wherein the p-surface comprises polygons approximating at least a portion of a sphere.

54. The method of claim 53, wherein the full-surround image data is derived from source image data generated from visible stimuli.

55. The method of claim 54, further comprising capturing the source image data using a single camera equipped with a fish-eye lens.

56. the method of claim 55, further comprising generating the full-surround image data by sampling points of the source image data defining the visible world.

57. The method of claim 54, further comprising capturing the source image data using n cameras, wherein n>2.

58. The method of claim 57, further comprising generating the full-surround image data by sampling points of the source image data defining the visible world.

59. The method of claim 54, wherein the source image data is captured using n cameras, wherein n>2.

60. The method of claim 59, wherein n is at least 6.

61. The method of claim 59, wherein the full-surround image data is derived by sampling points of the source image data defining the visible world.

62. The method of claim 54, wherein the source image data is captured using a single camera equipped with a fish-eye lens.

63. The method of claim 62, wherein the full-surround image data is derived by sampling points of the source image data defining the visible world.

64. The method of claim 54, wherein the p-surface comprises polygons approximating a cube.

65. The method of claim 54, wherein the p-surface comprises polygons approximating a tetrahedron.

66. The method of claim 54, wherein the p-surface comprises polygons approximating an ellipsoid.

67. The method of claim 54, wherein the p-surface comprises polygons approximating a dodecahedron.

68. The method of claim 54, wherein the p-surface comprises polygons approximating a cylinder.

69. The method of claim 54, wherein the full surround image data comprises an at least substantially spherical image data set.

70. The method of claim 54, wherein the full surround image data comprises an at least substantially cylindrical image data set.

71. The method of claim 54, wherein the full surround image data comprises an at least substantially hemispherical image data set.

72. The method of claim 54, wherein the displaying is performed using circular perspective.

73. The method of claim 54, wherein the method is performed using a 3D computer graphics system.

74. The method of claim 54, wherein the method is performed using a computer graphics system employing a conventional graphics library such as OpenGL.

75. The method of claim 54, further comprising a user selectively moving the view point toward and away from a surface area of the p-surface to thereby alter a perspective used for the displaying.

76. The method of claim 54, wherein the method is performed using a standard 3D computer graphics system.

77. The method of claim 54, wherein the displaying is performed using primitives of a 3D computer graphics system.

78. The method of claim 54, further comprising a user using an interactive viewing system to pan around imagery represented by the full-surround image data to give the user the effect of looking around at the imagery as if immersed within the p-surface, to thereby provide a virtual reality representation of the visible world.

79. The method of claim 54, further comprising a user using an input device to move the view point in and out along an axis relative to the p-surface to thereby effectively alter the user's view of the displayed portion of the texture-mapped p-surface.

80. The method of claim 54, further comprising a user using an input device to control rotation of the p-surface to thereby effectively allow the user to look around imagery represented by the full-surround image data of the texture-mapped p-surface.

81. The method of claim 54, further comprising:
a user using an input device to move the view point in and out along an axis relative to the p-surface to thereby effectively alter the user's view of the displayed portion of the texture-mapped p-surface; and
the user using the input device to control rotation of the p-surface to thereby effectively allow the user to look around imagery represented by the full-surround image data of the texture-mapped p-surface.

82. The method of claim 54, further comprising providing a user an option to zoom in on imagery represented by the full-surround image data of the texture-mapped p-surface.

83. The method of claim 54, further comprising a user using an input device to control the direction of view to thereby effectively allow the user to look around imagery represented by the full-surround image data of the texture-mapped p-surface.

84. The method of claim 54, further comprising using the method to generate a plurality of p-surfaces using different respective sets of full-surround image data.

85. The method of claim 54, wherein the method is implemented in a multimedia entertainment system.

86. The method of claim 54, further comprising enabling multiple users using independent viewing systems to independently cause to be displayed and to view any selected portion of the texture-mapped p-surface.

87. The method of claim 53, wherein the point of projection comprises the view point.

88. The method of claim 53, wherein the point of projection is different from the view point.

89. The method of claim 53, wherein the view point is within the p-surface.

90. The method of claim 53, wherein the selecting a direction of view is performed by a user.

91. The method of claim 53, wherein the full-surround image data is derived by sampling points defining the visible world.

92. The method of claim 53, further comprising generating the full-surround image data by sampling points defining the visible world.

93. The method of claim 53, wherein the p-surface comprises polygons approximating a cube.

94. The method of claim 53, wherein the p-surface comprises polygons approximating a tetrahedron.

95. The method of claim 53, wherein the p-surface comprises polygons approximating an ellipsoid.

96. The method of claim 53, wherein the p-surface comprises polygons approximating a dodecahedron.

97. The method of claim 53, wherein the p-surface comprises polygons approximating a cylinder.

98. The method of claim 53, wherein the displaying comprises displaying a user-selected portion of the texture-mapped p-surface.

99. The method of claim 53, further comprising a user selecting the portion of the texture-mapped p-surface to be displayed during the displaying.

100. The method of claim 53, further comprising a user selecting the portion of the texture-mapped p-surface to be displayed during the displaying via an interactive user interface.

101. The method of claim 100, wherein the user selecting the portion of the texture-mapped p-surface to be displayed is performed using a zoom function via the interactive user interface.

102. The method of claim 53, wherein the full surround image data comprises an at least approximately spherical image data set.

103. The method of claim 53, wherein the full surround image data comprises an at least approximately cylindrical image data set.

104. The method of claim 53, wherein the full surround image data comprises an at least approximately hemispherical image data set.

105. The method of claim 53, wherein the displaying is performed using linear perspective.

106. The method of claim 105, wherein the user is provided an option of selecting any one of linear perspective and circular perspective for the displaying.

107. The method of claim 105, wherein the user is provided an option of selecting any one of linear perspective, elliptical perspective, and circular perspective for the displaying.

108. The method of claim 53, wherein the texture-mapping is performed using stereographic projection.

109. The method of claim 53, wherein the displaying is performed using any user-selected one of linear perspective and circular perspective, at the user's option.

110. The method of claim 53, wherein the displaying is performed using any user-selected one of linear perspective, elliptical perspective, and circular perspective, at the user's option.

111. The method of claim 53, further comprising a user selectively moving the view point toward and away from a surface area of the p-surface to thereby alter a perspective used for the displaying.

112. The method of claim 53, wherein the method is performed using a 3D computer graphics system native to a personal computer.

113. The method of claim 53, further comprising a user using an interactive viewing system to pan around imagery represented by the full- surround image data to give the user the effect of looking around at the imagery as if immersed within the p-surface, to thereby provide a virtual reality representation of the visible world.

114. The method of claim 53, further comprising a user using an input device to move the view point in and out along an axis relative to the p-surface to thereby effectively alter the user's view of the displayed portion of the texture-mapped p-surface.

115. The method of claim 53, further comprising a user using an input device to control rotation of the p-surface to thereby effectively allow the user to look around imagery represented by the full-surround image data of the texture-mapped p-surface.

116. The method of claim 115, further comprising linking the plurality of p-surfaces in such a manner as to enable a user to hop amongst the plurality of p-surfaces to simulate a tour thereof.

117. The method of claim 53, further comprising:
   a user using an input device to move the view point in and out along an axis relative to the p-surface to thereby effectively alter the user's view of the displayed portion of the texture-mapped p-surface; and
   the user using the input device to control rotation of the p-surface to thereby effectively allow the user to look around imagery represented by the full-surround image data of the texture-mapped p-surface.

118. The method of claim 53, further comprising providing a user an option to zoom in on imagery represented by the full-surround image data of the texture-mapped p-surface.

119. The method of claim 53, further comprising a user using an input device to control the direction of view to thereby effectively allow the user to look around imagery represented by the full-surround image data of the texture-mapped p-surface.

120. The method of claim 53, further comprising using the method to generate a plurality of p-surfaces using different respective sets of full-surround image data.

121. The method of claim 120, further comprising linking the plurality of p-surfaces in such a manner as to enable a user to hop amongst the plurality of p-surfaces to simulate a tour thereof.

122. The method of claim 53, wherein the method is implemented in a multimedia entertainment system.

123. The method of claim 53, further comprising enabling multiple users using independent viewing systems to independently cause to be displayed and to view any selected portion of the texture-mapped p-surface.

* * * * *